United States Patent
Hibino et al.

(10) Patent No.: US 11,421,766 B2
(45) Date of Patent: Aug. 23, 2022

(54) GEAR TRAIN AND VEHICLE INSTALLING GEAR TRAIN

(71) Applicant: TOYOTA JIDOSHA KABUSHIKI KAISHA, Toyota (JP)

(72) Inventors: Akira Hibino, Susono (JP); Hideki Kubonoya, Toyota (JP); Hideaki Komada, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 195 days.

(21) Appl. No.: 16/683,464

(22) Filed: Nov. 14, 2019

(65) Prior Publication Data

US 2020/0158216 A1 May 21, 2020

(30) Foreign Application Priority Data

Nov. 15, 2018 (JP) .............................. JP2018-215023

(51) Int. Cl.
*F16H 1/20* (2006.01)
*F16H 37/04* (2006.01)
*B60K 17/16* (2006.01)

(52) U.S. Cl.
CPC ......... *F16H 37/041* (2013.01); *B60K 17/165* (2013.01); *F16H 1/20* (2013.01); *F16H 2702/02* (2013.01)

(58) Field of Classification Search
CPC ...... F16H 37/041; F16H 1/20; F16H 2702/02; B60K 17/165; B60K 2001/001; B60K 1/00; B60K 17/04; B60K 17/16; B60K 17/043; B60K 17/24; B60K 17/356; B60Y 2200/91
See application file for complete search history.

(56) References Cited

U.S. PATENT DOCUMENTS 3,136,379 A * 6/1964 Lauster .............. B62D 49/0621
　　　　　　　　　　　　　　　　　180/62
2017/0349157 A1* 12/2017 Hokoi ................... B60K 6/383
2018/0172130 A1 6/2018 Ohmura

FOREIGN PATENT DOCUMENTS

| DE | 102011100817 A1 * | 11/2012 | .............. B60K 1/00 |
| DE | 10 2013 204 227 A1 | 9/2014 | |
| DE | 10 2015 223 067 A1 | 5/2017 | |
| DE | 202017102980 U1 * | 8/2017 | .............. B60K 1/00 |
| EP | 1 526 027 A2 | 4/2005 | |
| EP | 1526027 A2 * | 4/2005 | ............ B60K 17/04 |
| JP | 2001-99243 A | 4/2001 | |
| JP | 2005-125920 A | 5/2005 | |
| JP | 2005-351471 A | 12/2005 | |
| JP | 2011-133110 A | 7/2011 | |
| JP | 2014-125141 A | 7/2014 | |
| JP | 2018-100719 A | 6/2018 | |
| WO | WO 2018/102498 A1 | 6/2018 | |

* cited by examiner

*Primary Examiner* — Justin Holmes
(74) *Attorney, Agent, or Firm* — Oblon, McClelland, Maier & Neustadt, L.L.P.

(57) ABSTRACT

Provided are a gear train and a vehicle installing the gear train. The gear train is configured to transmit power from a rotating electrical machine to a driving wheel through a differential and a drive shaft. The gear train includes a plurality of shafts on a plurality of axes lying different from each other and a plurality of gears that is disposed respectively on the plurality of shafts. At least one of the plurality of gears is an internal gear.

10 Claims, 8 Drawing Sheets

GEAR TRAIN AND VEHICLE INSTALLING GEAR TRAIN

CROSS-REFERENCE TO RELATED APPLICATIONS

This application claims priority to Japanese Patent Application No. 2018-215023 filed on Nov. 15, 2018, which is incorporated herein by reference in its entirety.

BACKGROUND

1. Technical Field

The present disclosure relates to a gear train and a vehicle installing the gear train.

2. Description of Related Art

Japanese Patent Application Publication No. 2011-133110 discloses a gear train of a vehicle including a plurality of gears that transmits power from a motor to driving wheels through a differential and drive shafts. This gear train of a vehicle includes a speed reduction unit that reduces the speed of power from the motor and transmits the power at a reduced speed in a power transmission path leading from the motor to the driving wheels.

SUMMARY

However, the power transmission efficiency of a gear train of a vehicle will decrease if power is transmitted through two external gears meshing with each other in a speed reduction unit etc.

The present disclosure provides a gear train of a vehicle that can achieve higher power transmission efficiency.

A first aspect of the present disclosure relates to a gear train. This gear train is installed in a vehicle and configured to transmit power from a rotating electrical machine to a driving wheel through a differential and a drive shaft. The gear train includes a plurality of shafts on a plurality of axes lying separately from each other and a plurality of gears that is disposed respectively on the plurality of shafts. At least one of the plurality of gears is an internal gear.

A second aspect of the present disclosure is a vehicle including a rotating electrical machine, a differential, a drive shaft, a driving wheel, and a gear train. This gear train includes a plurality of gears disposed respectively on a plurality of shafts on a plurality of axes lying separately from each other. The plurality of gears is configured to transmit power from the rotating electrical machine installed in the vehicle to the driving wheel through the differential and the drive shaft. At least one of the plurality of gears is an internal gear.

In the gear train of a vehicle of the first aspect and the vehicle of the second aspect, the gear train may include one or more speed reduction units. Each of the speed reduction units may provide a pair of gears included among the plurality of gears, and be configured to reduce the speed of power from the rotating electrical machine in a power transmission path leading from the rotating electrical machine to the driving wheel. An external gear and an internal gear may mesh with each other in at least one of the speed reduction units.

The gear train of a vehicle of the first aspect and the vehicle of the second aspect described above can achieve higher gear meshing efficiency in at least one of the speed reduction units and thereby reduce the power transmission loss.

In the gear train of a vehicle of the first aspect and the vehicle of the second aspect, the speed reduction unit may include a first speed reduction unit providing a pair of gears and a second speed reduction unit providing a pair of gears different from the pair of gears. An internal gear and an external gear may mesh with each other in one of the first speed reduction unit and the second speed reduction unit, and an external gear and an external gear of the other one of the first speed reduction unit and the second speed reduction unit may mesh with each other.

The gear train of a vehicle of the first aspect and the vehicle of the second aspect described above can achieve higher gear meshing efficiency in either the first speed reduction unit or the second speed reduction unit and thereby reduce the power transmission loss.

In the gear train of a vehicle of the first aspect and the vehicle of the second aspect, the plurality of gears may include a first gear provided on an output shaft of the rotating electrical machine, a second gear provided on the differential, and a third gear and a fourth gear that are provided on a shaft member disposed on an axis different from an axis of the output shaft and mesh with the first gear and the second gear, respectively. The first speed reduction unit may provide the first gear and the third gear, and the first gear may be an external gear and the third gear may be an internal gear. The second speed reduction unit may provide the second gear and the fourth gear, and the second gear and the fourth gear may be external gears.

The gear train of a vehicle of the first aspect and the vehicle of the second aspect described above can achieve higher gear meshing efficiency in the first speed reduction unit and thereby reduce the power transmission loss in the first speed reduction unit.

In the gear train of a vehicle of the first aspect and the vehicle of the second aspect, the plurality of gears may include a first gear provided on an output shaft of the rotating electrical machine, a second gear provided on the differential, and a third gear and a fourth gear that are provided on a shaft member disposed on an axis different from an axis of the output shaft and mesh with the first gear and the second gear, respectively. The first speed reduction unit may provide the first gear and the third gear, and the first gear and the third gear may be external gears. The second speed reduction unit may provide the second gear and the fourth gear, and the second gear may be an internal gear and the fourth gear may be an external gear.

The gear train of a vehicle of the first aspect and the vehicle of the second aspect described above can achieve higher gear meshing efficiency in the second speed reduction unit and thereby reduce the power transmission loss in the second speed reduction unit.

In the gear train of a vehicle of the first aspect and the vehicle of the second aspect, the speed reduction unit may include at least a first speed reduction unit providing a pair of gears and a second speed reduction unit providing a pair of gears different from the pair of gears. The internal gear and the external gear of the first speed reduction unit and the second speed reduction unit may mesh with each other.

The gear train of a vehicle of the first aspect and the vehicle of the second aspect described above can achieve higher gear meshing efficiency in both the first speed reduction unit and the second speed reduction unit and thereby reduce the power transmission loss.

In the gear train of a vehicle of the first aspect and the vehicle of the second aspect, the gears may include a first gear provided on an output shaft of the rotating electrical machine, a second gear provided on the differential, and a third gear and a fourth gear that are provided on a shaft member disposed on an axis different from an axis of the output shaft and mesh with the first gear and the second gear, respectively. The first speed reduction unit may provide the first gear and the third gear, and the first gear may be an external gear and the third gear may be an internal gear. The second speed reduction unit may provide the second gear and the fourth gear, and the second gear may be an internal gear and the fourth gear may be an external gear.

The gear train of a vehicle of the first aspect and the vehicle of the second aspect described above can achieve higher gear meshing efficiency in both the first speed reduction unit and the second speed reduction unit and thereby reduce the power transmission loss.

In the gear train of a vehicle of the first aspect and the vehicle of the second aspect, the first speed reduction unit may be located on the same side of the second speed reduction unit as the rotating electrical machine in an axial direction of an output shaft of the rotating electrical machine.

The gear train of a vehicle of the first aspect and the vehicle of the second aspect described above can achieve higher bending rigidity of the output shaft of the rotating electrical machine and higher gear meshing efficiency in the first speed reduction unit.

In the gear train and the vehicle installing the gear train according to the present disclosure, at least one of the gears of the gear train that transmit power from the rotating electrical machine is an internal gear, which is advantageous in that, compared with when all the gears are external gears, the gear meshing efficiency can be increased and the power transmission loss can be reduced, allowing for higher power transmission efficiency.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of a front-engine, front-wheel-drive (FF) electric vehicle to which the present disclosure is applied will be described below. It should be understood that the present disclosure is not limited by these embodiments. For example, the present disclosure is also applicable to an electric vehicle adopting the rear-engine, rear-wheel-drive (RR) system. The present disclosure is further applicable to a vehicle such as a fuel cell vehicle or a range extender vehicle that includes an internal combustion engine for generating electricity. Here, a range extender vehicle refers to an electric vehicle that uses an internal combustion engine not for driving the vehicle but exclusively for generating electricity. Thus, the present disclosure is applicable to an electrically powered vehicle that can travel by driving the driving wheels using power from a rotating electrical machine, such as a motor.

Figure 1:
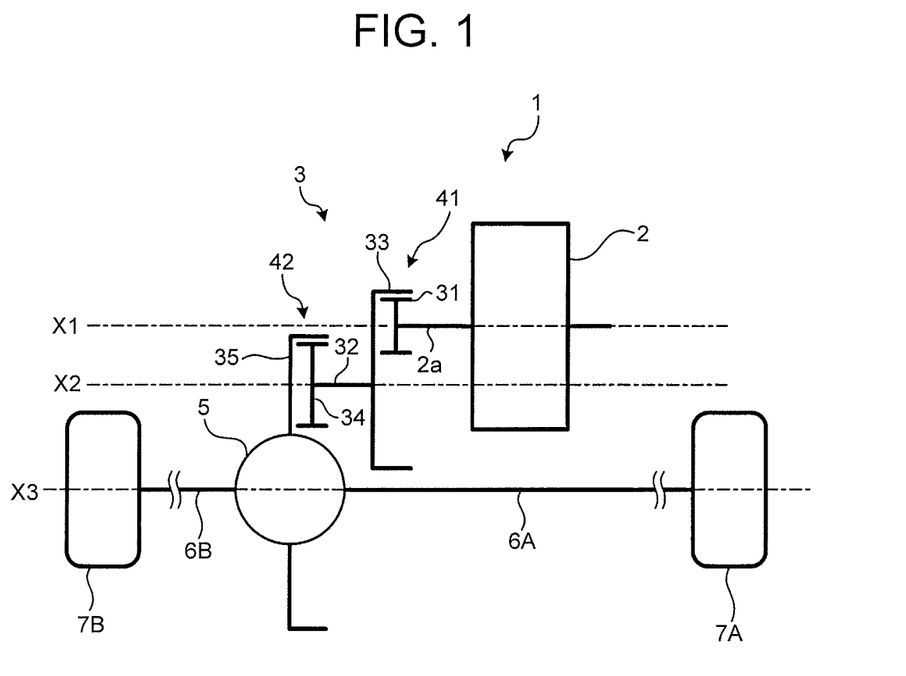
FIG. 1 is a skeleton diagram showing the general configuration of an electric vehicle according to a first embodiment of the present disclosure.

FIG. 1 is a skeleton diagram showing the general configuration of an electric vehicle 1 according to a first embodiment. As shown in FIG. 1, the electric vehicle 1 includes, as components of a drive system, a motor generator 2, a gear train 3, a differential 5, drive shafts 6A, 6B, a pair of driving wheels 7A, 7B, etc.

The motor generator 2 that is a rotating electrical machine includes a rotor shaft 2a, a stator and a rotor (neither is shown), etc., and serves as a travel driving source of the electric vehicle 1. The motor generator 2 drives the pair of driving wheels 7A, 7B by generating power using electricity from a battery (not shown). Moreover, the motor generator 2 can convert rotational energy from the pair of driving wheels 7A, 7B into electrical energy and charge the battery with this electrical energy.

The gear train 3 includes a pinion gear 31, a counter shaft 32, a counter driven gear 33, a final drive gear 34, a differential ring gear 35, etc. The pinion gear 31 is an external gear provided at one end of the rotor shaft 2a. The counter driven gear 33 is an internal gear provided at one end of the counter shaft 32. The final drive gear 34 is an external gear provided at the other end of the counter shaft 32. The differential ring gear 35 is an internal gear provided on the differential 5. A first axis X1 of the rotor shaft 2a, a second axis X2 of the counter shaft 32, and a third axis X3 that is a rotational center of the differential ring gear 35 are parallel to one another and lie separately from one another.

The pinion gear 31 provided on the rotor shaft 2a meshes with the counter driven gear 33 provided on the counter shaft 32. The final drive gear 34 provided on the counter shaft 32 meshes with the differential ring gear 35 provided on the differential 5. In the gear train 3, power from the motor generator 2 is transmitted from the pinion gear 31 provided on the rotor shaft 2a of the motor generator 2 to the differential 5 after the speed of the power is reduced at a predetermined speed reduction ratio through the counter driven gear 33, the counter shaft 32, the final drive gear 34, and the differential ring gear 35. The power transmitted to the differential 5 is transmitted to the drive shafts 6A, 6B coupled to the pair of driving wheels 7A, 7B and drives the pair of driving wheels 7A, 7B.

The electric vehicle 1 according to the first embodiment includes two speed reduction units each providing a pair of gears that reduce the speed of power from the motor generator 2 in the power transmission path leading from the motor generator 2 to the pair of driving wheels 7A, 7B. Specifically, the electric vehicle 1 includes a first speed reduction unit 41 providing the pinion gear 31 and the counter driven gear 33 having a larger number of teeth than the pinion gear 31, and a second speed reduction unit 42 providing the final drive gear 34 and the differential ring gear 35 having a larger number of teeth than the final drive gear 34.

In the first speed reduction unit 41, the pinion gear 31 that is an external gear and the counter driven gear 33 that is an internal gear mesh with each other so as to transmit power from the pinion gear 31 to the counter driven gear 33. Here, due to the difference between center positions of an external gear and an internal gear, tooth surfaces of the internal gear slide at a lower speed than those of the external gear. Since a gear loss is expressed by a coefficient of friction×tooth surface contact pressure×sliding speed, reducing the sliding speed results in a smaller loss and therefore higher gear meshing efficiency. In the electric vehicle 1 according to the first embodiment, an external gear and an internal gear mesh with each other in the first speed reduction unit 41. Compared with a configuration in which the counter driven gear 33 provides an external gear and two external gears mesh with each other in the first speed reduction unit 41, this configuration can achieve higher gear meshing efficiency. Thus, the electric vehicle 1 according to the first embodiment can reduce the power transmission loss in the first speed reduction unit 41, thereby allowing for higher power transmission efficiency.

In the second speed reduction unit 42, the final drive gear 34 that is an external gear and the differential ring gear 35 that is an internal gear mesh with each other so as to transmit power from the final drive gear 34 to the differential ring gear 35. Compared with a configuration in which the differential ring gear 35 provides an external gear and two external gears mesh with each other in the second speed reduction unit 42, this configuration can achieve higher gear meshing efficiency. Thus, the electric vehicle 1 according to the first embodiment can reduce the power transmission loss in the second speed reduction unit 42, thereby allowing for higher power transmission efficiency.

As has been described above, the electric vehicle 1 according to the first embodiment 1 has a configuration in which each of the first speed reduction unit 41 and the second speed reduction unit 42 transmits power through an external gear and an internal gear meshing with each other. Thus, the electric vehicle 1 according to the first embodiment can transmit power from the motor generator 2 to the pair of driving wheels 7A, 7B with higher efficiency than when the gear train 3 is configured such that power is transmitted through two external gears meshing with each other.

The first speed reduction unit 41 and the second speed reduction unit 42 are each formed by a pair of gears, and therefore there is one point in each speed reduction unit at which the gears mesh with each other. On the other hand, when a planetary gear mechanism is used as a component of a speed reduction unit having an internal gear, there are two points at which the gears mesh with each other, with the sun gear and the pinion gear meshing with each other at one point and the pinion gear and the ring gear meshing with each other at the other point. Thus, when each of the first speed reduction unit 41 and the second speed reduction unit 42 provides a pair of gears, power can be transmitted with a smaller number of gear meshing points and the power transmission loss can be thereby reduced, compared with when planetary gear mechanisms are used for these speed reduction units.

Moreover, when a planetary gear mechanism is used as a component of a speed reduction unit, the rotor shaft of the motor generator and an axis of the planetary gear mechanism are disposed coaxially, which may make it difficult to secure a clearance between the motor generator and the drive shaft. In the electric vehicle 1 according to the first embodiment, however, the rotor shaft 2a on which the pinion gear 31 is provided and the counter shaft 32 on which the counter driven gear 33 is provided are disposed parallel to each other on separate axes. Thus, it is easy to secure a clearance between the motor generator 2 or the counter driven gear 33 and the drive shaft 6A.

Figure 2:
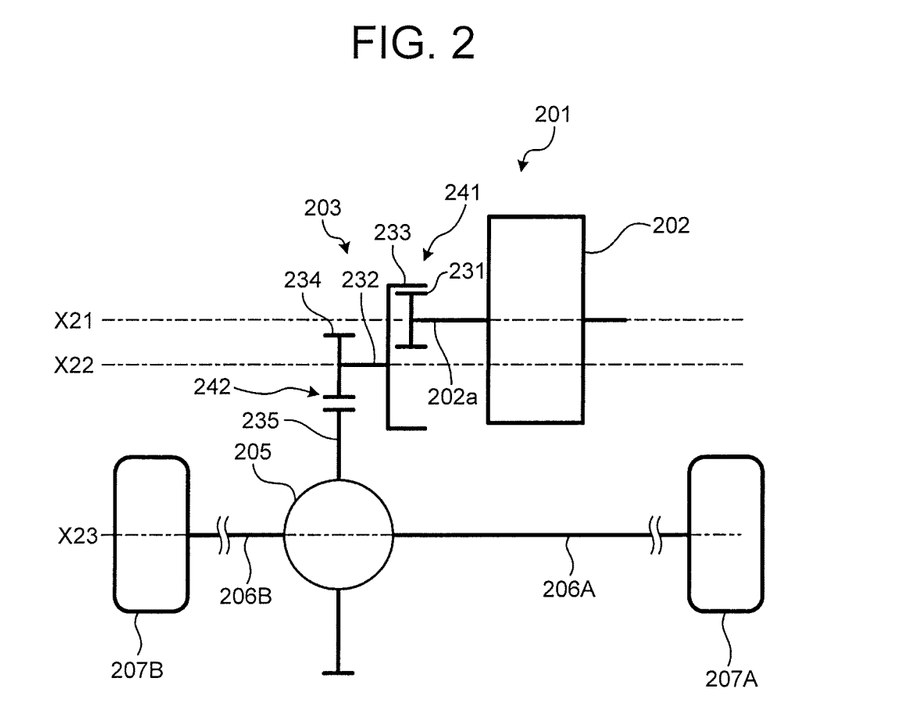
FIG. 2 is a skeleton diagram showing the general configuration of an electric vehicle according to a second embodiment.
Figure 3:
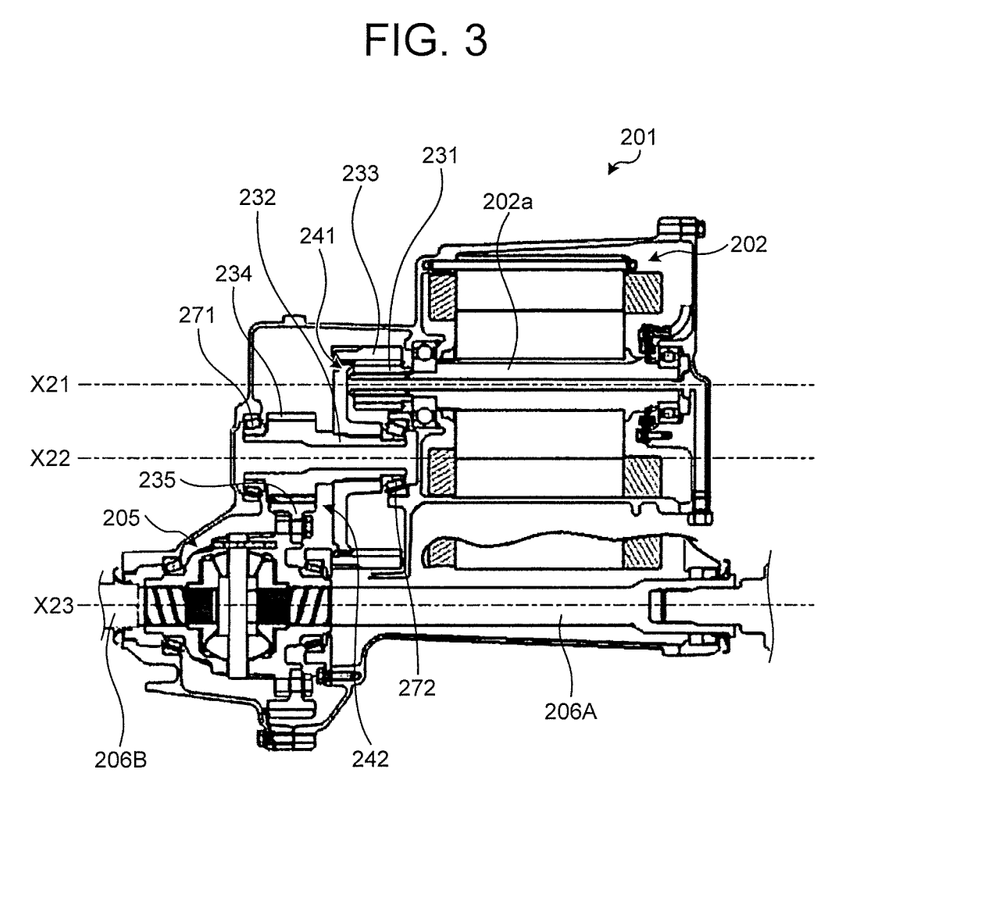
FIG. 3 is a schematic view showing a section of the general configuration of the electric vehicle according to the second embodiment.

FIG. 2 is a skeleton diagram showing the general configuration of an electric vehicle 201 according to a second embodiment. FIG. 3 is a schematic view showing the general configuration of the electric vehicle 201 according to the second embodiment.

As shown in FIG. 2, the electric vehicle 201 according to the second embodiment includes, as components of a drive system, a motor generator 202, a gear train 203, a differential 205, drive shafts 206A, 206B, a pair of driving wheels 207A, 207B, etc.

The gear train 203 includes a pinion gear 231, a counter shaft 232, a counter driven gear 233, a final drive gear 234, a differential ring gear 235, etc. The pinion gear 231 is an external gear provided at one end of a rotor shaft 202a. The counter driven gear 233 is an internal gear provided at one end of the counter shaft 232. The final drive gear 234 is an external gear provided at the other end of the counter shaft 232. The differential ring gear 235 is an external gear provided on the differential 205. A first axis X21 of the rotor shaft 202a, a second axis X22 of the counter shaft 232, and a third axis X23 that is a rotational center of the differential ring gear 235 are parallel to one another and lie separately from one another.

The pinion gear 231 provided on the rotor shaft 202a meshes with the counter driven gear 233 provided on the counter shaft 232. The final drive gear 234 provided on the counter shaft 232 meshes with the differential ring gear 235 provided on the differential 205. In the gear train 203, power from the motor generator 202 is transmitted from the pinion gear 231 provided on the rotor shaft 202a of the motor generator 202 to the differential 205 after the speed of the power is reduced at a predetermined speed reduction ratio through the counter driven gear 233, the counter shaft 232, the final drive gear 234, and the differential ring gear 235. The power transmitted to the differential 205 is transmitted to the drive shafts 206A, 206B coupled to the pair of driving wheels 207A, 207B and drives the pair of driving wheels 207A, 207B.

As shown in FIG. 2, the electric vehicle 201 according to the second embodiment includes two speed reduction units, and each of the two speed reduction units provides a pair of gears that reduce the speed of power from the motor generator 202 in a power transmission path leading from the motor generator 202 to the pair of driving wheels 207A, 207B. Specifically, the electric vehicle 201 includes a first speed reduction unit 241 formed by the pinion gear 231 and the counter driven gear 233 having a larger number of teeth than the pinion gear 231, and a second speed reduction unit 242 providing the final drive gear 234 and the differential ring gear 235 having a larger number of teeth than the final drive gear 234. In the electric vehicle 201 according to the second embodiment, the first speed reduction unit 241 is located on the same side of the second speed reduction unit 242 as the motor generator 202 in the direction of the first axis X21 of the rotor shaft 202a of the motor generator 202.

In the first speed reduction unit 241, the pinion gear 231 that is an external gear and the counter driven gear 233 that is an internal gear mesh with each other so as to transmit power from the pinion gear 231 to the counter driven gear 233. Compared with a configuration in which the counter driven gear 233 provides an external gear and two external gears mesh with each other in the first speed reduction unit 241, this configuration can achieve higher gear meshing efficiency. Thus, the power transmission loss in the first speed reduction unit 241 can be reduced, allowing for higher power transmission efficiency.

In the second speed reduction unit 242, the final drive gear 234 that is an external gear and the differential ring gear 235 that is an external gear mesh with each other so as to transmit power from the final drive gear 234 to the differential ring gear 235. Compared with a configuration in which an external gear and an internal gear mesh with each other in the second speed reduction unit 242, this configuration allows a larger clearance to be secured between the motor generator 202 or the counter driven gear 233 and the drive shaft 206A.

In the electric vehicle 201 according to the second embodiment, power is transmitted through the external gear and the internal gear meshing with each other in the first speed reduction unit 241. Compared with a configuration in which each of the first speed reduction unit 241 and the second speed reduction unit 242 transmits power through two external gears meshing with each other, this configuration can reduce the loss of power during transmission from the motor generator 202 to the pair of driving wheels 207A, 207B in the gear train 203. Accordingly, the power transmission efficiency can be increased. Moreover, since two external gears mesh with each other in the second speed reduction unit 242, the electric vehicle 201 according to the second embodiment can prevent interference between the motor generator 202 or the counter driven gear 233 and the drive shaft 206A.

In the electric vehicle 201 according to the second embodiment shown in FIG. 3, the counter shaft 232 is rotatably supported by a bearing 271 at an end on the opposite side from the motor generator 202 in the direction of the second axis X22, and is rotatably supported by a bearing 272 at an end on the side of the motor generator 202. The counter driven gear 233 and the final drive gear 234 are provided on inner sides of the bearings 271, 272, respectively, in the direction of the second axis X22 of the counter shaft 232.

Figure 4:
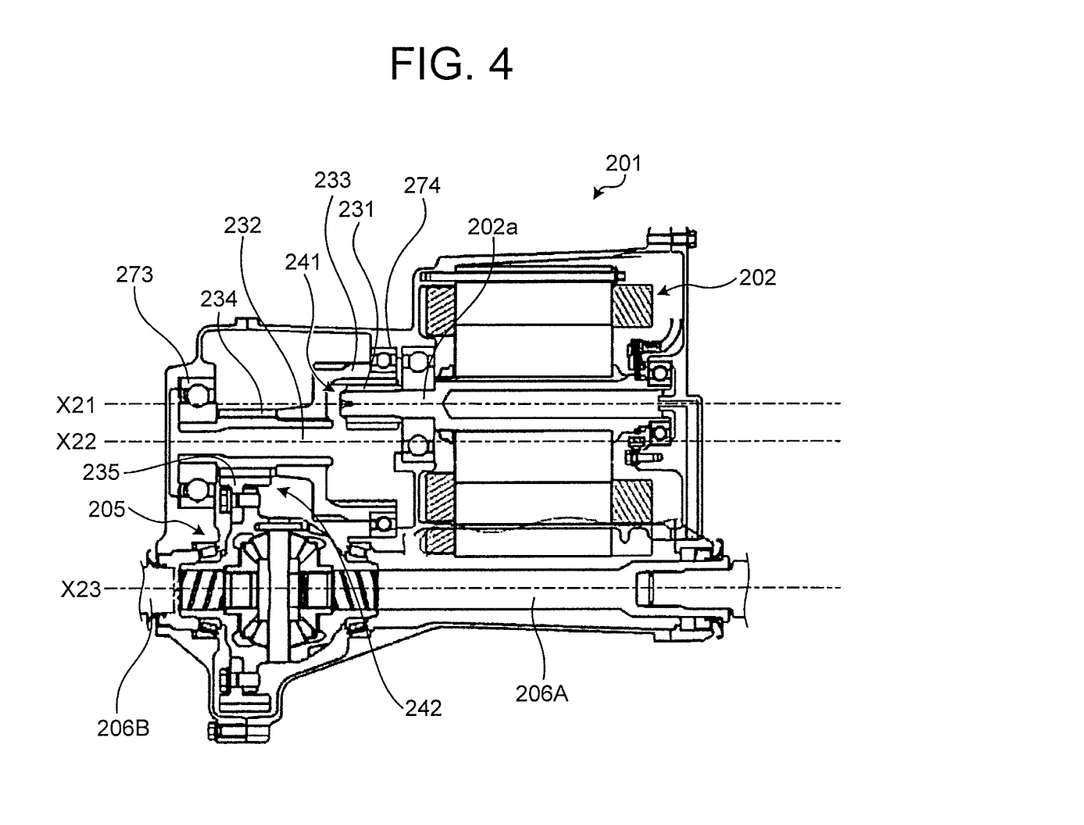
FIG. 4 is a schematic view showing a section of a modified example of the general configuration of the electric vehicle according to the second embodiment.

On the other hand, the electric vehicle 201 according to the second embodiment may have a configuration like that of a first modified example of the second embodiment shown in FIG. 4. In this first modified example, the counter shaft 232 is rotatably supported by a bearing 273 at an end on the opposite side from the motor generator 202 in the direction of the second axis X22, and is rotatably supported by a bearing 274 through the counter driven gear 233 at an end on the side of the motor generator 202 in the direction of the second axis X22. In the electric vehicle 201 of the first modified example shown in FIG. 4, the final drive gear 234 is provided on an inner side of the bearing 273 in the direction of the second axis X22 of the counter shaft 232. In the electric vehicle 201 of the first modified example shown in FIG. 4, the counter driven gear 233 is provided at the end of the counter shaft 232 on the side of the motor generator 202 in the direction of the second axis X22. An outer circumference of the counter driven gear 233 is fitted on an inner circumference of the bearing 274 such that the pinion gear 231, the counter driven gear 233, and the bearing 274 are located on the same straight line in a direction orthogonal to the direction of the second axis X22. Thus, when the pinion gear 231 and the counter driven gear 233 mesh with each other, a force with which the pinion gear 231 presses the counter driven gear 233 outward in the direction orthogonal to the direction of the second axis X22 can be borne by the bearing 274. As a result, deformation of the counter driven gear 233 in the direction orthogonal to the direction of the second axis X22 can be reduced, allowing for higher gear meshing efficiency of the pinion gear 231 and the counter driven gear 233.

Figure 5:
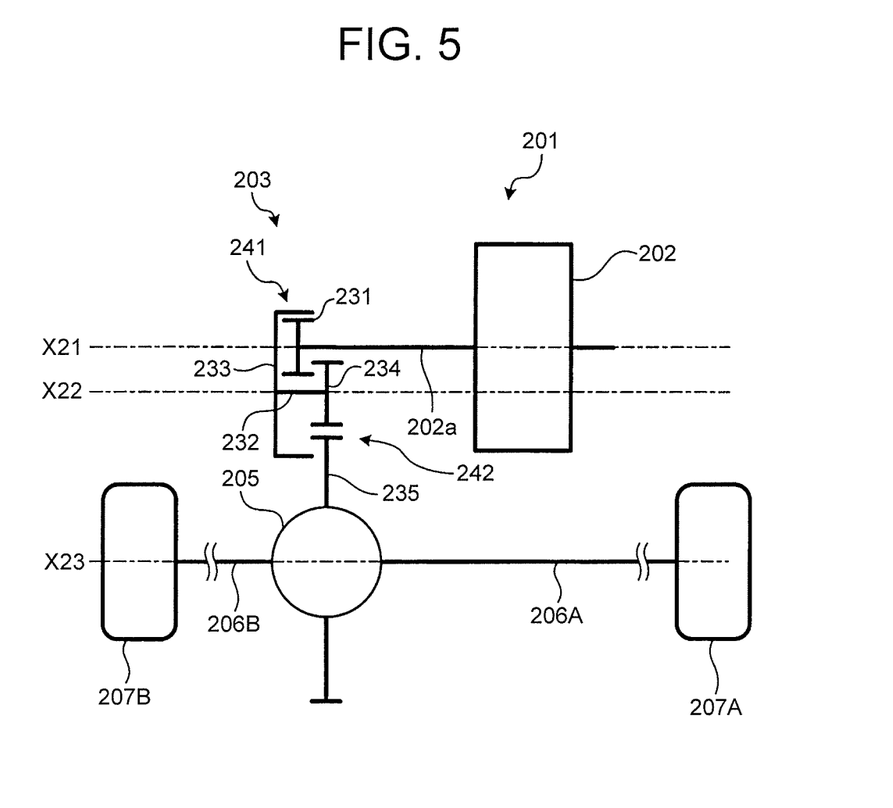
FIG. 5 is a skeleton diagram showing a modified example of the general configuration of the electric vehicle according to the second embodiment.

FIG. 5 is a skeleton diagram showing a second modified example of the general configuration according to the second embodiment. As shown in FIG. 5, the second modified example of the electric vehicle 201 according to the second embodiment has a configuration in which the first speed reduction unit 241 is located on the opposite side of the second speed reduction unit 242 from the motor generator 202 in the direction of the second axis X22 of the rotor shaft 202a of the motor generator 202. On the other hand, in the electric vehicle 201 of the second embodiment shown in FIG. 2, the first speed reduction unit 241 is located on the same side as the motor generator 202. This configuration can reduce the length of the rotor shaft 202a compared with that in which the first speed reduction unit 241 is located on the opposite side from the motor generator 202 as in the electric vehicle 201 of the second modified example shown in FIG. 5. Thus, the electric vehicle 201 of the second embodiment can achieve higher bending rigidity of the rotor shaft 202a. With the bending rigidity of the rotor shaft 202a thus enhanced, bending deformation and vibration of the rotor shaft 202a due to meshing of the pinion gear 231 and the counter driven gear 233 provided at a free end of the rotor shaft 202a can be reduced accordingly. As a result, the gear meshing efficiency of the pinion gear 231 and the counter driven gear 233 can be increased.

Figure 6:
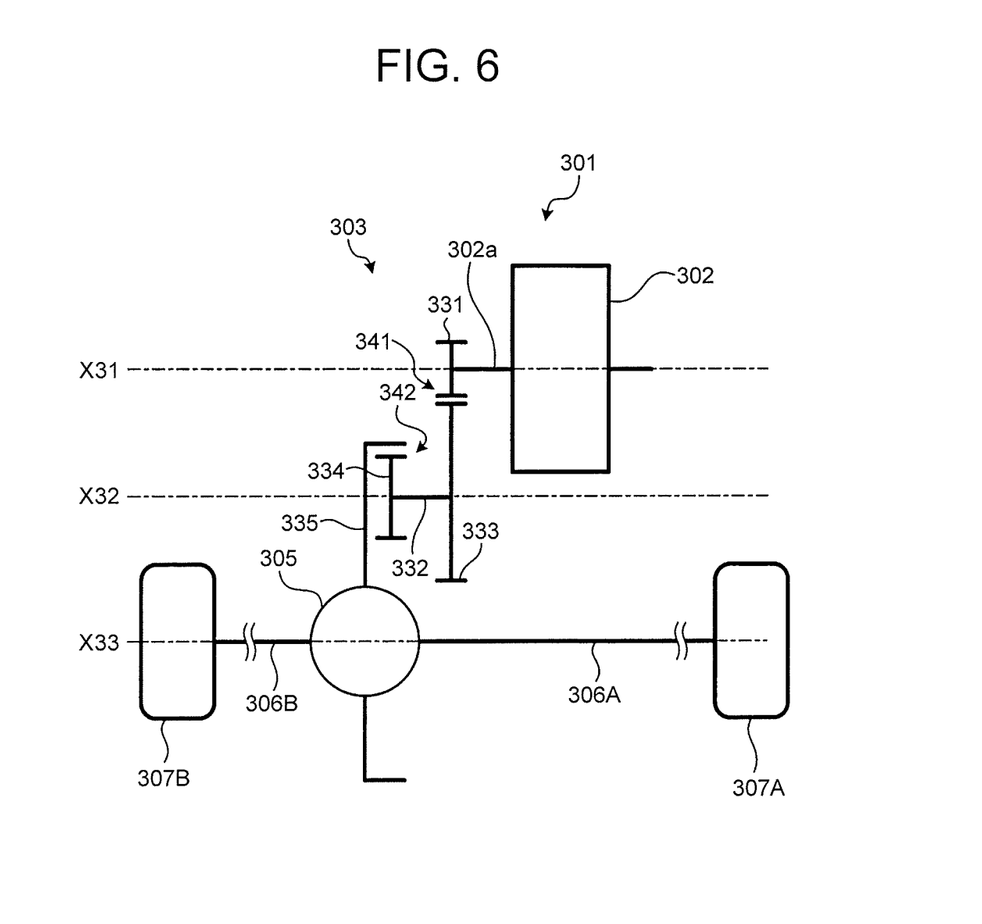
FIG. 6 is a skeleton diagram showing the general configuration of an electric vehicle according to a third embodiment.

FIG. 6 is a skeleton diagram showing the general configuration of an electric vehicle 301 according to a third embodiment. As shown in FIG. 6, the electric vehicle 301 according to the third embodiment includes, as components of a drive system, a motor generator 302, a gear train 303, a differential 305, drive shafts 306A, 306B, a pair of driving wheels 307A, 307B, etc.

The gear train 303 includes a pinion gear 331, a counter shaft 332, a counter driven gear 333, a final drive gear 334, a differential ring gear 335, etc. The pinion gear 331 is an external gear provided at one end of a rotor shaft 302a. The counter driven gear 333 is an external gear provided at one end of the counter shaft 332. The final drive gear 334 is an external gear provided at the other end of the counter shaft 332. The differential ring gear 335 is an internal gear provided on the differential 305. A first axis X31 of the rotor shaft 302a, a second axis X32 of the counter shaft 332, and a third axis X33 that is a rotational center of the differential ring gear 335 are parallel to one another and lie separately from one another.

The pinion gear 331 provided on the rotor shaft 302a meshes with the counter driven gear 333 provided on the counter shaft 332. The final drive gear 334 provided on the counter shaft 332 meshes with the differential ring gear 335 provided on the differential 305. In the gear train 303, power from the motor generator 302 is transmitted from the pinion gear 331 provided on the rotor shaft 302a of the motor generator 302 to the differential 305 after the speed of the power is reduced at a predetermined speed reduction ratio through the counter driven gear 333, the counter shaft 332, the final drive gear 334, and the differential ring gear 335. The power transmitted to the differential 305 is transmitted to the drive shafts 306A, 306B coupled to the pair of driving wheels 307A, 307B and drives the pair of driving wheels 307A, 307B.

As shown in FIG. 6, the electric vehicle 301 according to the third embodiment includes two speed reduction units and each of the two speed reduction units provides a pair of gears that reduce the speed of power from the motor generator 302 in a power transmission path leading from the motor generator 302 to the pair of driving wheels 307A, 307B. Specifically, the electric vehicle 301 includes a first speed reduction unit 341 providing the pinion gear 331 and the counter driven gear 333 having a larger number of teeth than the pinion gear 331, and a second speed reduction unit 342 providing the final drive gear 334 and the differential ring gear 335 having a larger number of teeth than the final drive gear 334. In the electric vehicle 301 according to the third embodiment, the first speed reduction unit 341 is located on the same side of the second speed reduction unit 342 as the motor generator 302 in the direction of the first axis X31 of the rotor shaft 302a of the motor generator 302.

In the first speed reduction unit 341, the pinion gear 331 that is an external gear and the counter driven gear 333 that is an external gear mesh with each other so as to transmit power from the pinion gear 331 to the counter driven gear 333.

In the second speed reduction unit 342, the final drive gear 334 that is an external gear and the differential ring gear 335 that is an internal gear mesh with each other so as to transmit power from the final drive gear 334 to the differential ring gear 335. Thus, compared with when the differential ring gear 335 provides an external gear and two external gears mesh with each other in the second speed reduction unit 342, the gear meshing efficiency can be increased and the power transmission loss in the second speed reduction unit 342 can be reduced, allowing for higher power transmission efficiency.

In the electric vehicle 301 according to the third embodiment, the second speed reduction unit 342 transmits power through the external gear and the internal gear meshing with each other. Compared with a configuration in which each of the first speed reduction unit 341 and the second speed reduction unit 342 transmits power through two external gears meshing with each other, this configuration can reduce the loss of power during transmission from the motor generator 302 to the pair of driving wheels 307A, 307B in the gear train 303, thereby allowing for higher power transmission efficiency.

Figure 7:
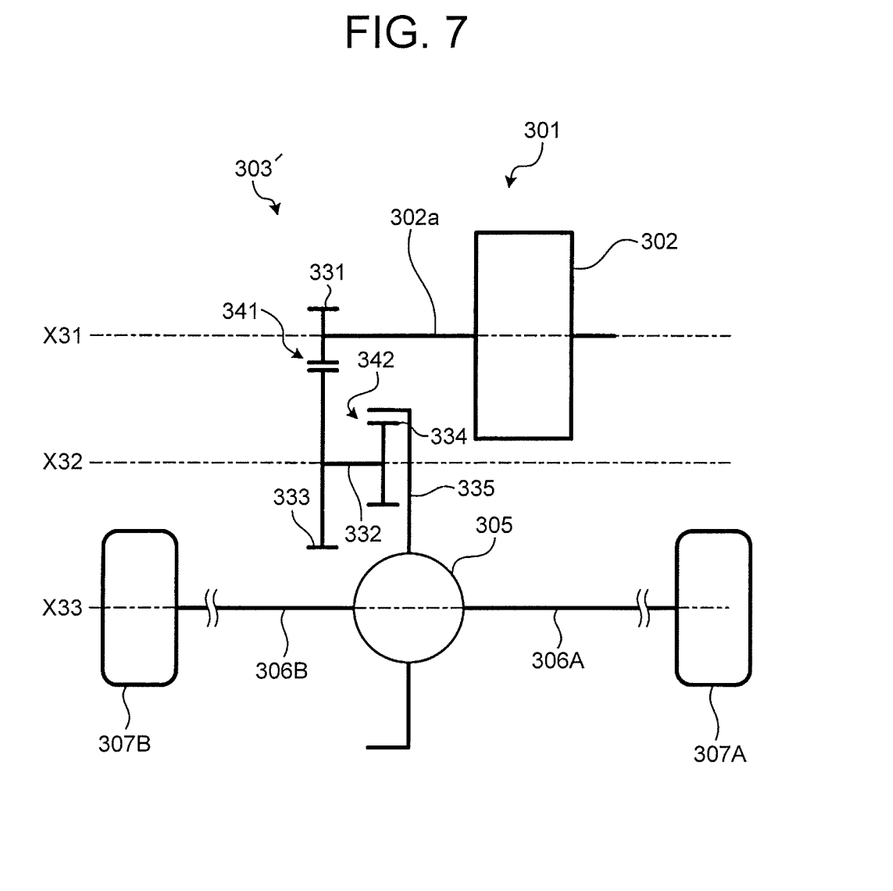
FIG. 7 is a skeleton diagram showing a modified example of the general configuration of the electric vehicle according to the third embodiment.

As shown in a gear train 303' of FIG. 7, the electric vehicle 301 according to the third embodiment may have a configuration in which the first speed reduction unit 341 is located on the opposite side of the second speed reduction unit 342 from the motor generator 302 in the direction of the first axis X31 of the rotor shaft 302a of the motor generator 302. On the other hand, when the first speed reduction unit 341 is located on the same side as the motor generator 302 as shown in FIG. 6, the length of the rotor shaft 302a can be reduced and the bending rigidity of the rotor shaft 302a can be enhanced compared with when the first speed reduction unit 341 is located on the opposite side from the motor generator 302 as shown in FIG. 7. Thus, bending deformation and vibration of the rotor shaft 302a due to meshing of the pinion gear 331 and the counter driven gear 333 can be reduced, and the gear meshing efficiency of the pinion gear 331 and the counter driven gear 333 can be increased.

Figure 8:
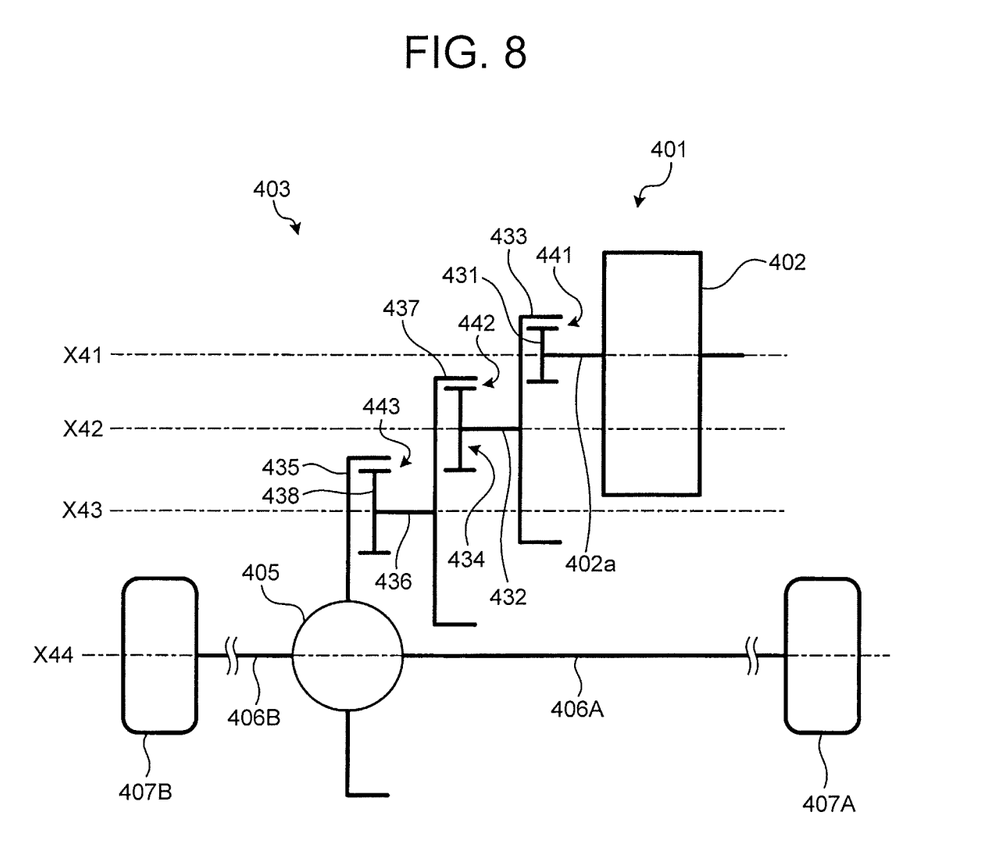
FIG. 8 is a skeleton diagram showing the general configuration of an electric vehicle according to a fourth embodiment.

FIG. 8 is a skeleton diagram showing the general configuration of an electric vehicle 401 according to a fourth embodiment. As shown in FIG. 8, the electric vehicle 401 according to the fourth embodiment includes, as components of a drive system, a motor generator 402, a gear train 403, a differential 405, drive shafts 406A, 406B, a pair of driving wheels 407A, 407B, etc.

In the electric vehicle 401 according to the fourth embodiment, the gear train 403 includes a pinion gear 431, a first counter shaft 432, a first counter driven gear 433, a counter drive gear 434, a second counter shaft 436, a second counter driven gear 437, a final drive gear 438, a differential ring gear 435, etc. The pinion gear 431 is an external gear provided at one end of a rotor shaft 402a. The first counter driven gear 433 is an internal gear provided at one end of the first counter shaft 432. The counter drive gear 434 is an external gear provided at the other end of the first counter shaft 432. The second counter driven gear 437 is an internal gear provided at one end of the second counter shaft 436. The final drive gear 438 is an external gear provided at the other end of the second counter shaft 436. The differential ring gear 435 is an internal gear provided on the differential 405. A first axis X41 of the rotor shaft 402a, a second axis X42 of the first counter shaft 432, a third axis X43 of the second counter shaft 436, and a fourth axis X44 that is a rotational center of the differential ring gear 435 are parallel to one another and lie separately from one another.

The pinion gear 431 provided on the rotor shaft 402a meshes with the first counter driven gear 433 provided on the first counter shaft 432. The counter drive gear 434 provided on the first counter shaft 432 meshes with the second counter driven gear 437 provided on the second counter shaft 436. The final drive gear 438 provided on the second counter shaft 436 meshes with the differential ring gear 435 provided on the differential 405. In the gear train 403, power from the motor generator 402 is transmitted from the pinion gear 431 provided on the rotor shaft 402a of the motor generator 402 to the differential 405 after the speed of the power is reduced at a predetermined speed reduction ratio through the first counter driven gear 433, the first counter shaft 432, the counter drive gear 434, the second counter driven gear 437, the second counter shaft 436, the final drive gear 438, and the differential ring gear 435. The power transmitted to the differential 405 is transmitted to the drive shafts 406A, 406B coupled to the pair of driving wheels 407A, 407B and drives the pair of driving wheels 407A, 407B.

As shown in FIG. 8, the electric vehicle 401 according to the fourth embodiment includes three speed reduction units and each of the three speed reduction units provides a pair of gears that reduce the speed of power from the motor generator 402 in a power transmission path leading from the motor generator 402 to the pair of driving wheels 407A, 407B. Specifically, the electric vehicle 401 includes a first speed reduction unit 441 providing the pinion gear 431 and the first counter driven gear 433 having a larger number of teeth than the pinion gear 431, a second speed reduction unit 442 providing the counter drive gear 434 and the second counter driven gear 437 having a larger number of teeth than the counter drive gear 434, and a third speed reduction unit 443 providing the final drive gear 438 and the differential ring gear 435 having a larger number of teeth than the final drive gear 438.

In the first speed reduction unit 441, the pinion gear 431 that is an external gear and the first counter driven gear 433 that is an internal gear mesh with each other so as to transmit power from the pinion gear 431 to the first counter driven gear 433. Thus, compared with when the first counter driven gear 433 provides an external gear and two external gears mesh with each other in the first speed reduction unit 441, the gear meshing efficiency can be increased and the power transmission loss in the first speed reduction unit 441 can be reduced, allowing for higher power transmission efficiency.

In the second speed reduction unit 442, the counter drive gear 434 that is an external gear and the second counter driven gear 437 that is an internal gear mesh with each other so as to transmit power from the counter drive gear 434 to the second counter driven gear 437. Thus, compared with when the second counter driven gear 437 provides an external gear and two external gears mesh with each other in the second speed reduction unit 442, the gear meshing efficiency can be increased and the power transmission loss in the second speed reduction unit 442 can be reduced, allowing for higher power transmission efficiency.

In the third speed reduction unit 443, the final drive gear 438 that is an external gear and the differential ring gear 435 that is an internal gear mesh with each other so as to transmit power from the final drive gear 438 to the differential ring gear 435. Thus, compared with when the differential ring gear 435 provides an external gear and two external gears mesh with each other in the third speed reduction unit 443, the gear meshing efficiency can be increased and the power transmission loss in the third speed reduction unit 443 can be reduced, allowing for higher power transmission efficiency.

As has been described above, in the electric vehicle 401 according to the fourth embodiment, the gear train 403 is configured such that each of the first speed reduction unit 441, the second speed reduction unit 442, and the third speed reduction unit 443 transmits power through an external gear and an internal gear meshing with each other. Thus, the electric vehicle 401 according to the fourth embodiment can transmit power from the motor generator 402 to the pair of driving wheels 407A, 407B with higher efficiency than when the gear train 403 is configured such that each of the first speed reduction unit 441, the second speed reduction unit 442, and the third speed reduction unit 443 transmits power through two external gears meshing with each other.

In the electric vehicle 401 according to the fourth embodiment, each of the first speed reduction unit 441, the second speed reduction unit 442, and the third speed reduction unit 443 is configured such that an external gear and an internal gear mesh with each other. Alternatively, at least one of these speed reduction units may be configured such that an external gear and an internal gear mesh with each other. Moreover, the electric vehicle 401 may have a configuration in which the gear train 403 includes four or more speed reduction units on a plurality of axes and power is transmitted through an external gear and an internal gear meshing with each other in at least one of the speed reduction units.

Figure 9:
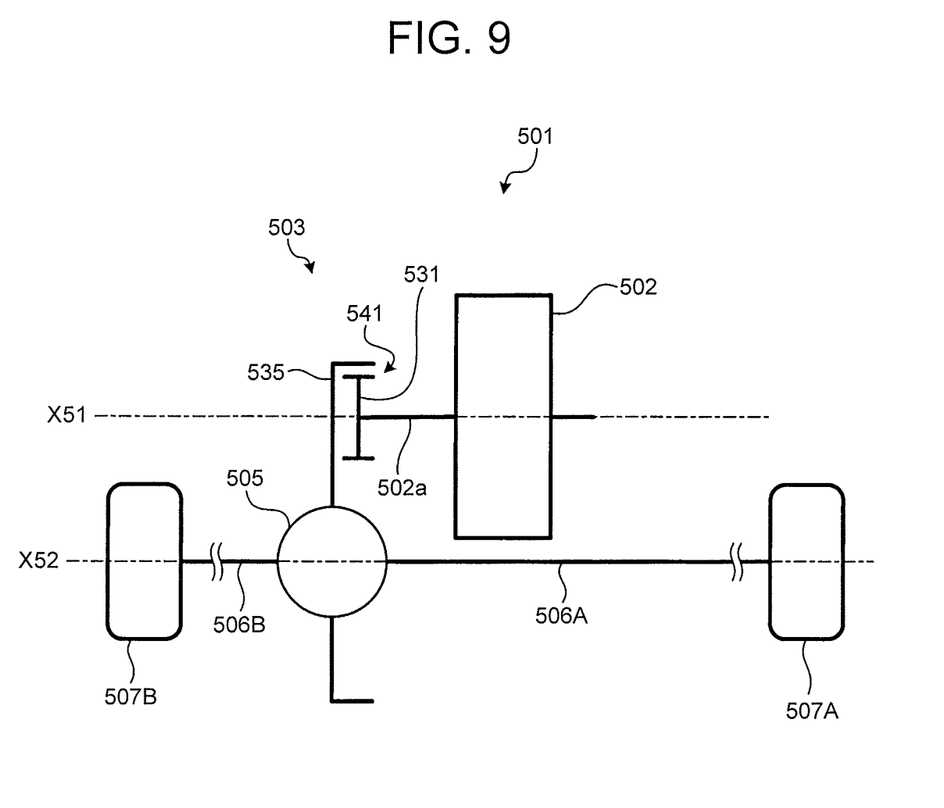
FIG. 9 is a skeleton diagram showing the general configuration of an electric vehicle according to a fifth embodiment.

FIG. 9 is a skeleton diagram showing the general configuration of an electric vehicle 501 according to a fifth embodiment. As shown in FIG. 9, the electric vehicle 501 according to the fifth embodiment includes, as components of a drive system, a motor generator 502, a gear train 503, a differential 505, drive shafts 506A, 506B, a pair of driving wheels 507A, 507B, etc.

In the electric vehicle 501 according to the fifth embodiment, the gear train 503 includes a pinion gear 531, a differential ring gear 535, etc. The pinion gear 531 is an external gear provided at one end of a rotor shaft 502a. The differential ring gear 535 is an internal gear provided on the differential 505. A first axis X51 of the rotor shaft 502a and a second axis X52 that is a rotational center of the differential ring gear 535 are parallel to each other and lie separately from one another.

In the gear train 503, power is input from the pinion gear 531 provided on the rotor shaft 502a of the motor generator 502 into the differential ring gear 535 after the speed of the power is reduced at a predetermined speed reduction ratio, and this power is transmitted to the differential 505. The power transmitted to the differential 505 is transmitted to the drive shafts 506A, 506B coupled to the pair of driving wheels 507A, 507B and drives the pair of driving wheels 507A, 507B.

As shown in FIG. 9, the electric vehicle 501 according to the fifth embodiment includes one speed reduction unit providing a pair of gears that reduce the speed of power from the motor generator 502 in a power transmission path leading from the motor generator 502 to the pair of driving wheels 507A, 507B. Specifically, the electric vehicle 501 includes a speed reduction unit 541 providing the pinion gear 531 and the differential ring gear 535 having a larger number of teeth than the pinion gear 531.

In the speed reduction unit 541, the pinion gear 531 that is an external gear and the differential ring gear 535 that is an internal gear mesh with each other so as to transmit power from the pinion gear 531 to the differential ring gear 535. Thus, compared with when the differential ring gear 535 provides an external gear and two external gears mesh with each other in the speed reduction unit 541, the gear meshing efficiency can be increased and the power transmission loss in the speed reduction unit 541 can be reduced, allowing for higher power transmission efficiency. Therefore, the electric vehicle 501 according to the fifth embodiment can transmit power from the motor generator 502 to the pair of driving wheels 507A, 507B by the gear train 503 with high efficiency.

What is claimed is:

1. A gear train installed in a vehicle and configured to transmit power from a rotating electrical machine to a driving wheel through a differential and a drive shaft, the gear train comprising:
   a plurality of shafts on a plurality of axes lying separately from each other; and
   a plurality of gears that is disposed respectively on the plurality of shafts, at least one of the plurality of gears being an internal gear;
   one or more speed reduction units, each of the speed reduction units provides a pair of gears included among the plurality of gears, and the speed reduction units are configured to reduce speed of power from the rotating electrical machine in a power transmission path leading from the rotating electrical machine to the driving wheel; and
   an external gear and an internal gear that mesh with each other in at least one of the speed reduction units, wherein
   the speed reduction unit includes a first speed reduction unit providing a pair of gears and a second speed reduction unit providing a pair of gears different from the pair of gears of the first speed reduction unit, an internal gear and an external gear of the first speed reduction unit mesh with each other, and an external gear and an external gear of the second speed reduction unit mesh with each other,
   the plurality of gears includes a first gear provided on an output shaft of the rotating electrical machine, a second gear provided on the differential, and a third gear and a fourth gear that are provided on a shaft member disposed on an axis different from an axis of the output shaft and mesh with the first gear and the second gear, respectively, the first speed reduction unit provides the first gear and the third gear, the first gear being an external gear and the third gear being an internal gear, and the second speed reduction unit provides the second gear and the fourth gear, the second gear and the fourth gear being external gears.

2. The gear train according to claim 1, wherein the first speed reduction unit is located on the same side of the second speed reduction unit as the rotating electrical machine in an axial direction of an output shaft of the rotating electrical machine.

3. A gear train installed in a vehicle and configured to transmit power from a rotating electrical machine to a driving wheel through a differential and a drive shaft, the gear train comprising:
- a plurality of shafts on a plurality of axes lying separately from each other; and
- a plurality of gears that is disposed respectively on the plurality of shafts, at least one of the plurality of gears being an internal gear; and
- one or more speed reduction units, each of the speed reduction units provides a pair of gears included among the plurality of gears, and the speed reduction units are configured to reduce speed of power from the rotating electrical machine in a power transmission path leading from the rotating electrical machine to the driving wheel, wherein
- the speed reduction unit includes at least a first speed reduction unit providing a pair of gears and a second speed reduction unit providing a pair of gears different from the pair of gears of the first speed reduction unit, and
- the internal gear and an external gear mesh with each other in each of the first speed reduction unit and the second speed reduction unit.

4. The gear train according to claim 3, wherein:
the gears include a first gear provided on an output shaft of the rotating electrical machine, a second gear provided on the differential, and a third gear and a fourth gear that are provided on a shaft member disposed on an axis different from an axis of the output shaft and mesh with the first gear and the second gear, respectively;
the first speed reduction unit provides the first gear and the third gear, the first gear being an external gear and the third gear being an internal gear; and
the second speed reduction unit provides the second gear and the fourth gear, the second gear being an internal gear and the fourth gear being an external gear.

5. The gear train according to claim 3, wherein the first speed reduction unit is located on the same side of the second speed reduction unit as the rotating electrical machine in an axial direction of an output shaft of the rotating electrical machine.

6. A vehicle, comprising:
a rotating electrical machine;
a differential;
a drive shaft;
a driving wheel; and
a gear train including a plurality of gears disposed respectively on a plurality of shafts on a plurality of axes lying separately from each other, wherein:

the plurality of gears is configured to transmit power from the rotating electrical machine installed in the vehicle to the driving wheel through the differential and the drive shaft; and at least one of the plurality of gears is an internal gear, wherein the gear train includes one or more speed reduction units, each of the speed reduction units provides a pair of gears included among the plurality of gears, and are configured to reduce speed of power from the rotating electrical machine in a power transmission path leading from the rotating electrical machine to the driving wheel, an external gear and an internal gear mesh with each other in at least one of the speed reduction units, the speed reduction unit includes a first speed reduction unit providing a pair of gears and a second speed reduction unit providing a pair of gears different from the pair of gears of the first speed reduction unit, an internal gear and an external gear mesh with each other in one of the first speed reduction unit, and an external gear and an external gear mesh with each other in the second speed reduction unit, the plurality of gears includes a first gear provided on an output shaft of the rotating electrical machine, a second gear provided on the differential, and a third gear and a fourth gear that are provided on a shaft member disposed on an axis different from an axis of the output shaft and mesh with the first gear and the second gear, respectively, the first speed reduction unit provides the first gear and the third gear, the first gear being an external gear and the third gear being an internal gear, and the second speed reduction unit provides the second gear and the fourth gear, the second gear and the fourth gear being external gears.

7. The vehicle according to claim 6, wherein the first speed reduction unit is located on the same side of the second speed reduction unit as the rotating electrical machine in an axial direction of an output shaft of the rotating electrical machine.

8. A vehicle, comprising:
a rotating electrical machine;
a differential;
a drive shaft;
a driving wheel; and
a gear train including a plurality of gears disposed respectively on a plurality of shafts on a plurality of axes lying separately from each other, wherein:

the plurality of gears is configured to transmit power from the rotating electrical machine installed in the vehicle to the driving wheel through the differential and the drive shaft; and at least one of the plurality of gears is an internal gear, wherein the gear train includes one or more speed reduction units, each of the speed reduction units provides a pair of gears included among the plurality of gears, and are configured to reduce speed of power from the rotating electrical machine in a power transmission path leading from the rotating electrical machine to the driving wheel, the speed reduction unit includes at least a first speed reduction unit providing a pair of gears and a second speed reduction unit providing a pair of gears different from the pair of gears of the first speed reduction unit, and the internal gear and an external gear mesh with each other in each of the first speed reduction unit and the second speed reduction unit.

9. The vehicle according to claim 8, wherein:

the gears include a first gear provided on an output shaft of the rotating electrical machine, a second gear provided on the differential, and a third gear and a fourth gear that are provided on a shaft member disposed on an axis different from an axis of the output shaft and mesh with the first gear and the second gear, respectively;

the first speed reduction unit provides the first gear and the third gear, the first gear being an external gear and the third gear being an internal gear; and the second speed reduction unit provides the second gear and the fourth gear, the second gear being an internal gear and the fourth gear being an external gear.

10. The vehicle according to claim 8, wherein the first speed reduction unit is located on the same side of the second speed reduction unit as the rotating electrical machine in an axial direction of an output shaft of the rotating electrical machine.

\* \* \* \* \*